United States Patent [19]
Datta et al.

[11] Patent Number: 5,558,957
[45] Date of Patent: Sep. 24, 1996

[54] METHOD FOR MAKING A THIN FLEXIBLE PRIMARY BATTERY FOR MICROELECTRONICS APPLICATIONS

[75] Inventors: Madhav Datta, Yorktown Heights; Ravindra V. Shenoy, Peekskill, both of N.Y.

[73] Assignee: International Business Machines Corporation, Armonk, N.Y.

[21] Appl. No.: 329,347

[22] Filed: Oct. 26, 1994

[51] Int. Cl.$^6$ ................................................ H01M 4/70
[52] U.S. Cl. ........................ 429/127; 429/234; 29/623.4; 29/623.5
[58] Field of Search ................................ 429/127, 233, 429/234; 427/123, 393.5; 29/623.4, 623.5; 204/290 R

[56] References Cited

U.S. PATENT DOCUMENTS

| | | | |
|---|---|---|---|
| 3,240,662 | 3/1966 | Smyers et al. | 427/393.5 X |
| 3,353,999 | 11/1967 | Osborn | 429/127 |
| 4,092,464 | 5/1978 | Dey et al. | 429/127 |
| 4,840,856 | 6/1989 | Nakacho et al. | 429/192 |
| 5,011,749 | 4/1991 | Manassen et al. | 429/101 |
| 5,180,645 | 1/1993 | Moré | 429/127 |
| 5,219,680 | 6/1993 | Fauteux | 429/192 |
| 5,314,507 | 5/1994 | Rossoll | 29/623.5 X |
| 5,415,948 | 5/1995 | Gauthier | 429/234 X |
| 5,431,701 | 7/1995 | Kagawa et al. | 429/127 X |
| 5,441,830 | 8/1995 | Moulton et al. | 429/233 X |

FOREIGN PATENT DOCUMENTS 6-338330  12/1994  Japan ............................ H01M 6/18

*Primary Examiner*—Stephen Kalafut
*Attorney, Agent, or Firm*—Gary M. Hartman; Domenica N. S. Hartman; Stephen S. Strunck

[57] ABSTRACT

A method is provided for making a flexible primary battery suitable for microelectronics applications, and more particularly, for use with self-contained self-powered portable devices (SSPD) such as RF-ID tags. The method generally employs photolithography and etching techniques to minimize the thicknesses of metal foils required in the structure of the battery, as well as packaging methods which yield a flexible and durable battery having a thickness of not more than about 0.5 millimeter, and preferably about 0.3 millimeter or less, and a relatively small size on the order of a few square centimeters in surface area.

29 Claims, 1 Drawing Sheet

METHOD FOR MAKING A THIN FLEXIBLE PRIMARY BATTERY FOR MICROELECTRONICS APPLICATIONS

The present invention relates to batteries which are suitable for use in microelectronics applications. More particularly, this invention relates to a thin and flexible primary battery whose size and flexibility enable its use in applications involving self-contained self-powered portable devices (SSPD), such as radio frequency identification tags and smart cards.

BACKGROUND OF THE INVENTION

The functional specifications of a battery used in self-contained self-powered portable devices (SSPD), such as radio frequency identification (RF-ID) tags and smart cards, include a nominal cell voltage of 3 volts, high energy density and specific energy, which generally necessitates the use of a primary (non-rechargeable) lithium battery. However, such a battery must also be extremely flexible and small, generally not more than about 0.3 millimeter in thickness and a few square centimeters in surface area. In addition to RF-ID tags, it is believed that batteries having the above characteristics would also be well suited for other SSPD applications in the mobile electronics and communications industries.

While small flexible batteries are generally known in the art, as evidenced by U.S. Pat. No. 4,092,464 to Dey et al., their performance, manufacturability, cost-efficiency and/or durability are generally inadequate for use in SSPDs. In particular, the present technology of lithium canisters, or button cells, does not provide the flexibility demanded by SSPD applications, and is severely constrained in the thickness of the cells that can be reliably and repeatably formed in mass production. Reduction in cell thickness is often limited by the thickness of the battery buttons, which generally is greater than about 50 micrometers, such that the battery buttons constitute a sizable portion of the overall battery thickness.

Accordingly, what is needed is a light-weight, thin and flexible primary battery which can be readily and reliably manufactured to be suitable for powering an SSPD.

SUMMARY OF THE INVENTION

It is therefore an object of this invention to provide a thin and flexible primary battery which is suitably durable for SSPD applications such as RF-ID tags, and has a cell voltage of at least about 3 volts.

It is a further object of this invention to provide a method for making such a flexible primary battery, wherein the method is capable of reliably manufacturing such batteries in mass production.

It is yet another object of this invention that such a method employ well-accepted processing techniques so as to enhance the manufacturability and cost-efficiency of the battery.

In accordance with a preferred embodiment of this invention, these and other objects and advantages are accomplished as follows.

According to the present invention, there is provided a method for making a flexible primary battery suitable for SSPD applications. The method of this invention generally employs photolithography and etching techniques to minimize the thicknesses of metal foils required in the structure of the battery, as well as packaging methods which yield a flexible and durable battery having a thickness of not more than about 0.5 millimeter, and preferably about 0.3 millimeter or less, and a relatively small size on the order of a few square centimeters in surface area.

The method of this invention generally entails forming a pair of flexible current collectors, each of which is formed by photolithographically developing a metal foil on one surface of a polymeric sheet, and then etching the metal foil such that the polymeric sheet is exposed at the perimeter of the first surface. A very thin metal film is also formed on the opposite surface of the polymeric sheet, such that the current collectors are free-standing and each have a thickness of less than about 50 micrometers. Preferably, the polymeric sheet constitutes more than half of the thickness of each current collector so as to promote their flexibility.

Assembly involves placing a thin lithium foil anode on the metal foil of one of the current collectors, and thereafter, in the following order, a flexible lithium salt-doped polymeric electrolyte membrane and a flexible foil cathode composed of an inorganic powder of lithium intercalation compound and a lithium salt dispersed in a polymeric binder. The combined thickness of the added layers is preferably less than about 0.2 millimeter. The above structure is then circumscribed with a polymeric wall or spacer which abuts the polymeric sheet exposed along the perimeter of the current collector.

The remaining current collector is then placed on the flexible foil cathode such that the collector's metal foil overlays the flexible foil cathode and such that the polymeric sheet exposed along the perimeter of the current collector abuts the polymeric wall. The battery assembly formed in accordance with the above is then heat sealed such that the polymeric wall and the polymeric constituents of the current collectors, polymer electrolyte membrane and foil cathode partially melt, and thereby bond so as to form a durable hermetically sealed package which encloses the metal foils of the current collectors, the lithium foil anode, the polymer electrolyte membrane, and the flexible foil cathode.

The battery produced by the above method is sufficiently thin to impart a significant degree of flexibility to the battery, yet is also characterized as possessing the functional and structural capabilities necessary for use as the power source of a SSPD. Accordingly, a significant advantage of the present invention is that the primary battery of this invention is small, generally about 0.3 millimeter or less in thickness and a few square centimeters in surface area, yet is capable of meeting the demanding application requirements of a SSPD. Another significant advantage is that the method of this invention is capable of reliably manufacturing such batteries in mass production, since the present method employs reliable and well-accepted processing techniques so as to enhance the manufacturability and cost-efficiency of the battery.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings in which.

DETAILED DESCRIPTION OF THE INVENTION

The present invention provides a primary lithium battery for use in SSPD applications, in which the battery is constructed to be extremely thin and flexible, yet meets the demanding application requirements of a SSPD, while also being amenable to mass production.

Figure 1:
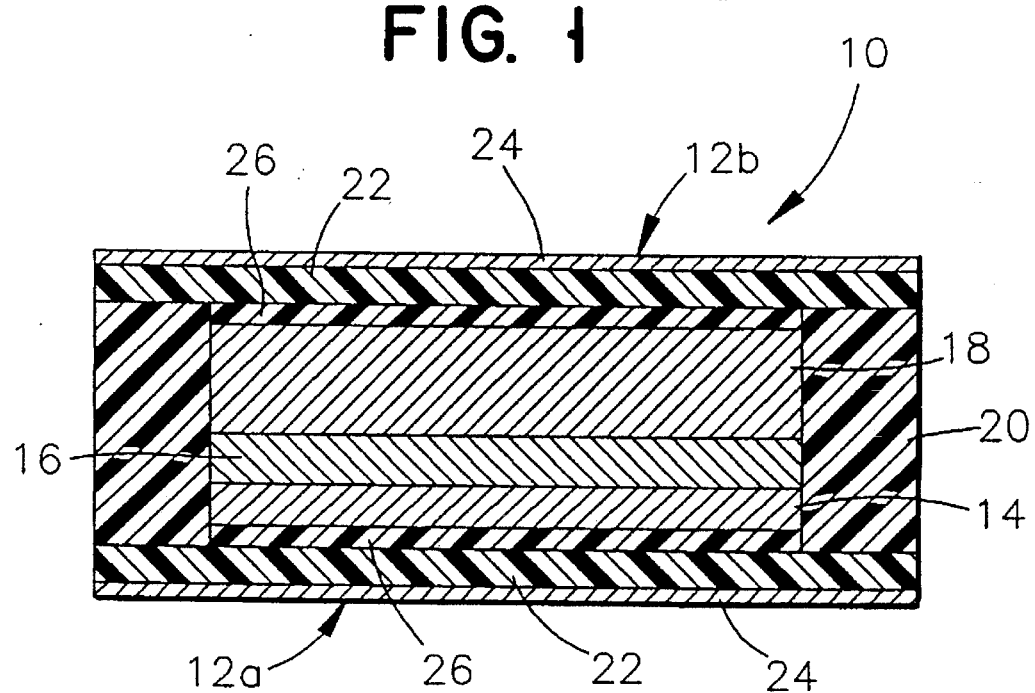
FIG. 1 shows a flexible primary battery in accordance with a preferred embodiment of this invention in cross-section and FIG. 2 is a top view of the battery of FIG. 1.

A primary lithium battery 10 in accordance with the present invention is represented in cross-section in FIG. 1. The battery 10 generally includes a pair of current collectors 12a and 12b, a lithium foil anode 14, a solid polymeric electrolyte 16, and a flexible cathode 18. A polymer spacer 20 circumscribes the anode 14, electrolyte 16 and cathode 18 as shown. The battery 10 has a preferred thickness of less than about 0.5 millimeter, and more preferably about 0.3 millimeter or less. The shape of the battery 10 is preferably rectangular when viewed from above, and is generally on the order of a few centimeters per side. As those skilled in the art will recognize, a suitable shape and size for the battery 10 will depend on the particular application for the SSPD and the cell capacity required.

As shown in FIG. 1, the flexible current collectors 12a and 12b have a laminar construction of preferably less than about 50 micrometers in thickness. In accordance with this invention, the current collectors 12a and 12b perform the important functions of providing flexible packaging for the battery 10, encapsulating the lithium foil anode 14, polymer electrolyte membrane 16 and foil cathode 18 so as to protect these components from air and moisture, and to aid in the heat sealing of the battery 10. The current collectors 12a and 12b are composed of a polymeric sheet 22 with a metal barrier film 24 deposited on one of its surfaces and a metal foil 26 disposed on its opposite surface.

The polymeric sheet 22 constitutes more than half of the thickness of each current collector 12a and 12b so as to promote their flexibility. The polymeric sheet 22 is preferably a polyester, though other suitable materials could be used, and has a thickness of about 15 to about 50 micrometers, preferably about 25 micrometers. The metal foil 26 is preferably a copper foil having a thickness of about 15 to about 25 micrometers, preferably about 15 micrometers.

As shown in FIG. 1, the metal foil 26 does not cover the entire surface of the polymeric sheet 22, but leaves exposed the entire perimeter of the polymeric sheet 22. The barrier film 24 serves as a barrier to moisture and air for the battery 10, and is preferably copper or aluminum having a thickness of about 500 to about 10,000 angstroms, preferably about 1000 angstroms. Those skilled in the art will appreciate that other metals and metal alloys could be used as suitable substitutes for those noted for the barrier film 24 and the metal foil 26.

The spacer 20 and the barrier films 24 of the current collectors 12a and 12b form the primary structural members of the battery 10, and eliminate the conventional requirement for separate and additional packaging of the battery 10. The spacer 20 abuts and seals the exposed perimeter of each polymeric sheet 22, so as to form a cavity which completely circumscribes and encloses the lithium foil anode 14, the polymer electrolyte membrane 16, and the foil cathode 18. The spacer 20 is preferably formed of polyethylene oxide, polyester or a suitable thermosetting film material. The height of the spacer 20 is roughly the same as the combined thicknesses of the metal foils 26, the lithium foil anode 14, the polymer electrolyte membrane 16 and the foil cathode 18, while its width must be sufficient to form a durable and reliable seal with the polymeric sheets 22. In practice, a width of about 1 to about 5 millimeters, preferably about 1 millimeter, has been found to be suitable. As will be noted below, the spacer 20 also forms seals all the perimeters of the polymer electrolyte membrane 16 and the foil cathode 18.

The lithium foil anode 14 has a thickness of about 30 to about 50 micrometers, with a preferred thickness of about 30 micrometers, but is otherwise conventional in tenths of lithium anodes for primary lithium batteries. The solid polymer electrolyte membrane 16 is preferably composed of polyethylene oxide doped with a lithium salt, such as lithium triflate ($LiCF_3SO_3$), lithium tetrafluoroborate ($LiBF_4$), or lithium bis(trifluoromethane sulfone)imide ($LiN(SO_2CF_3)_2$). A preferred ratio of polymer to lithium salt is about 4:1 to about 10:1. The polymer electrolyte membrane 16 has a preferred thickness of not more than about 50 micrometers.

Finally, the flexible foil cathode 18 is composed of an inorganic powder of lithium intercalation compound and lithium salts dispersed in a polymeric binder. The foil cathode 18 may also include additions of an electrical conductivity enhancer, such as up to about 10 weight percent carbon. Inorganic lithium intercalation compounds are preferred in that they can be readily handled. The lithium salts reduce resistance to lithium ion transport through the composite foil cathode 18, and thereby serve to improve performance of the battery 10. The polymeric binder forms an encapsulating matrix for the lithium intercalation compound and lithium salts, and eliminates the requirement for volatile organic liquids such as propylene carbonate and ethers which would likely be detrimental to the battery seal. The polymer binder also permits the foil cathode 18 to be formed with thicknesses on the order of tens of micrometers, and enables the foil cathode 18 to form a seal with the spacer 20.

In a preferred embodiment, the lithium intercalation compound is manganese dioxide ($MnO_2$) and constitutes at least about 75 weight percent of the foil cathode 18 so as to achieve suitable conductivity. The polymeric binder is preferably polyethylene oxide, and the lithium salts are preferably lithium triflate and/or lithium tetrafluoroborate and/or lithium bis(trifluoromethane sulfone) imide. The ratio of lithium salts to polymeric binder is preferably about 1:4 to about 1:10. The final thickness of the foil cathode 18 is preferably between about 50 to about 100 micrometers.

The method for making the battery 10 depicted in FIG. 1 generally involves the following processing steps and techniques. The steps involving lithium, lithium salts and battery assembly should preferably be performed in a dry and inert atmosphere. As a first step, the flexible current collectors 12a and 12b are formed to be substantially identical. Due to the extreme thinness of the barrier films 24 and metal foils 26, these layers must be formed using precision deposition techniques. Accordingly, the current collectors 12a and 12b are formed by photolithographically developing the metal foil 26 to a thickness of about 15 micrometers on one surface of the polymeric sheet 22, which preferably has a thickness of about 25 micrometers. Either a photoresist mask or a metal mask can be suitably used to delineate an appropriate pattern for the metal foil 26 in accordance with techniques known in the art.

Figure 2:
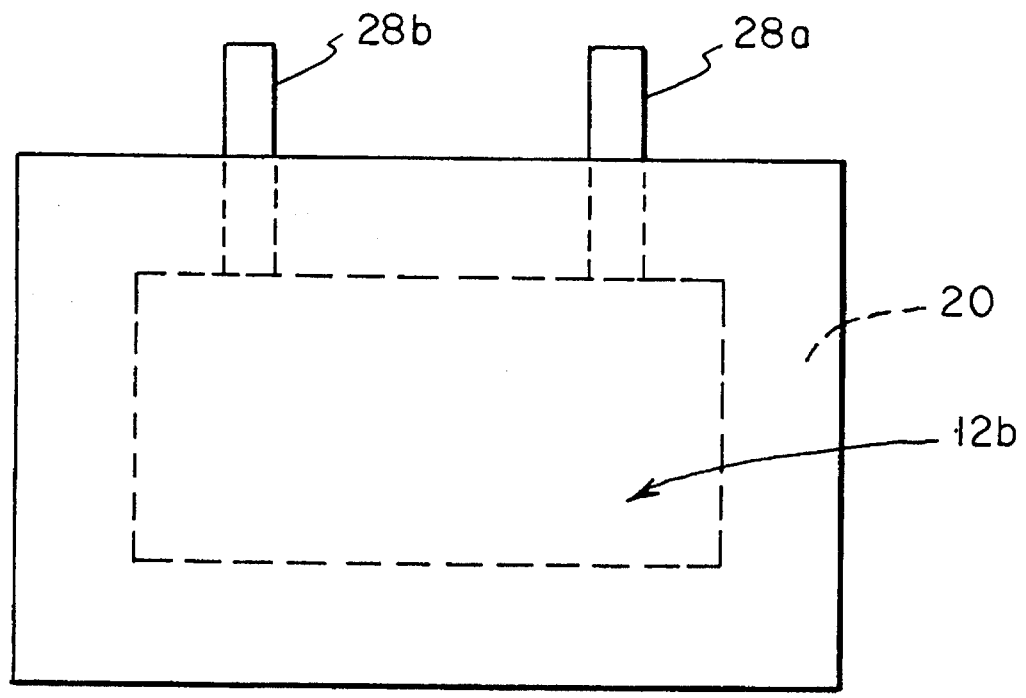

With the mask in place, the metal foil 26 can be etched back such that the polymeric sheet 22 is exposed at the perimeter of the surface while at the same time current collector leads 28a and 28b, shown in FIG. 2, are formed. Collector lead 28a is associated with anode 14 and collector lead 28b is associated with cathode 18. As shown in FIG. 2, collector leads 28a and 28b are rectangular tab-like structures protruding from the side of the battery while this arrangement has been found to be particularly useful when the battery is used with RF-ID tags, it will be recognized that other current collector lead arrangements and configurations are also possible, and may be necessary, depending on the application in which the battery is used, and that such leads need not be of the same configuration. The preferred etching technique is a wet chemical etch using a mixture of acetic, nitric and phosphoric acids, though dry chemical or electrochemical etching techniques could also be used. The preferred photolithographic and wet chemical etching techniques are known in the art, and therefore will not be discussed in further detail.

The barrier film 24 is then deposited on the opposite surface of the polymeric sheet 22. The barrier film 24 preferably has a thickness of about 1000 angstroms, necessitating such precision deposition techniques as sputtering and evaporation, each of which are known in the art. The resultant current collectors 12a and 12b are free-standing, yet each has a thickness of only about 40 micrometers. Accordingly, the current collectors 12a and 12b are extremely flexible.

The lithium foil anode 14 is then placed on the metal foil 26 of one of the current collectors 12a, followed by the lithium salt-doped polymer electrolyte membrane 16. Suitable polymer electrolyte membranes 16 have been prepared by dissolving polyethylene oxide and either lithium triflate or lithium tetrafluoroborate or lithium bis(trifluoromethane sulfone)imide in acetonitrile, with the preferred polymer-to-lithium salt ratio being about 4:1 to about 10:1. The solution was carefully cast and allowed to dry in a polytetrafluoroethylene (PTFE) dish. As the solution dried, the acetonitrile evaporated to leave behind approximately a 50 micrometer film of polyethylene oxide doped with the lithium salt. The procedure for preparing the polymer electrolyte membrane 16 was conducted in an inert atmosphere due to the hygroscopic nature of the lithium salts.

After the polymer electrolyte membrane 16 is in place, the foil cathode 18 is positioned on the polymer electrolyte membrane 16. The foil cathode 18 is preferably prepared by mixing the inorganic powder of lithium intercalation compound, the polymeric binder and the lithium salt in an organic solvent, such as acetonitrile, methanol or ethanol. The slurry is then cast and dried to form a free-standing film as thin as about 50 micrometers. Alternatively, the slurry can be spin coated or brush coated directly onto the metal foil 26 of the remaining current collector 12b.

The spacer 20 can be positioned on and abutted against the perimeter of the polymeric sheet 22 of the current collector 12a prior to or after the placement of the above-noted layers. Importantly, the spacer 20 surrounds the metal foil 26 of the current collector 12a, the lithium foil anode 14, the polymer electrolyte membrane 16 and the foil cathode 18, and also preferably contacts the perimeters of each of these components. The remaining current collector 12b is then positioned on the foil cathode 18 such that its metal foil 26 overlays the foil cathode 18 and such that the exposed perimeter of its polymeric sheet 22 abuts the spacer 20.

After all of the battery components are in place, the battery 10 is sealed by heating the assembly such that the polymeric sheets 22 of the current collectors 12a and 12b, the polymer electrolyte membrane 16 and the spacer 20 partially melt to form a flexible, hermetically sealed package which encloses the metal foils 26 of the current collectors 12a and 12b, the lithium foil anode 14, the polymer electrolyte membrane 16, and the foil cathode 18. Preferably, the polymeric constituents of the polymer electrolyte membrane 16 and the foil cathode 18 also partially melt and bond to the spacer 20. Using the preferred polymer materials noted above, a suitable temperature for the heating step is about 170° C., though higher or lower temperatures could be used, particularly if different polymer materials were employed to form the components.

The battery 10 formed by the above method is characterized by a preferred thickness of not more than about 0.5 millimeter, such that the resultant battery is extremely flexible. In addition, batteries formed in accordance with the preferred method have been produced which are characterized by the following functional properties: a cell voltage of at least about 3 volts; a capacity of at least about 3 milliamp-hours; a stand-by current of at least about 75 nanoamps; a peak current of at least about 100 microamps for 10 milliseconds; and an operating temperature range of about $-20°$ C. to about 55° C. As such, the battery 10 of this invention is highly suited for installation on a SSPD, which can be performed in any suitable manner.

In addition, if a copper current collector is used, the battery 10 can be solder bonded to the tag using conventional solder techniques.

From the above, it can be seen that an advantage of the present invention is that the primary battery 10 of this invention is small, generally about 0.3 millimeter or less in thickness and a few square centimeters in surface area, yet is capable of meeting the demanding application requirements of a SSPD. The spacer 20 and the polymeric sheets 22 of the current collectors 12a and 12b cooperate to form a durably and hermetically sealed, yet flexible, enclosure for the internal components of the battery, while the barrier films 26 provide further protection to the internal components without significantly sacrificing flexibility. Finally, the heating step serves to bond the majority of the battery's components together, so as to further promote the structural integrity and durability of the battery 10.

Another significant advantage is that the method of this invention utilizes proven manufacturing techniques in a manner which enables the battery 10 to be reliably mass produced. Advantageously, the techniques adopted by the present method significantly enhance the manufacturability and cost-efficiency of the flexible battery 10, thereby yielding a primary battery which can be mass produced for SSPD applications, as well as mobile electronics and communication equipment.

While our invention has been described in terms of a preferred embodiment, it is apparent that other forms could be adopted by one skilled in the art. For example, other materials could be used or developed as substitutes for those noted. Therefore, the scope of our invention is to be limited only by the following claims.

The embodiments of the invention in which an exclusive property or privilege is claimed are defined as follows:

1. A flexible primary battery suitable for microelectronics applications, the battery comprising::

a first flexible current collector comprising a first polymeric sheet having a first metal foil on a first surface of the first polymeric sheet and a first metal film on a second surface of the first polymeric sheet, the first polymeric sheet being exposed at the perimeter of the first surface;

a polymeric wall sealingly abutting the polymeric sheet along the perimeter of the first surface so as to form a cavity with the first flexible current collector;

a lithium anode disposed within the cavity and overlaying the first metal foil on the first surface of the first polymeric sheet;

a flexible lithium electrolyte membrane disposed within the cavity and overlaying the lithium anode;

a flexible cathode disposed within the cavity and overlaying the lithium electrolyte membrane, the cathode comprising an inorganic powder of lithium intercalation compound and lithium salts dispersed in a polymeric binder;

a second flexible current collector comprising a second polymeric sheet having a second metal foil on a first surface of the second polymeric sheet and a second metal film on a second surface of the second polymeric sheet, the second polymeric sheet sealingly abutting the polymeric wall at the perimeter of the first surface of the second polymeric sheet; and leads associated with the first and second flexible current collectors;

wherein the first and second polymeric sheets and the polymeric wall form a sealed package which encloses the lithium anode, the lithium electrolyte membrane, and the cathode.

2. A flexible primary battery as recited in claim 1 wherein the first polymeric sheet of the first flexible current collector and the second polymeric sheet of the second flexible current collector each constitute more than half of the thickness of the first and second flexible current collectors, respectively, so as to promote the flexibility of the first and second flexible current collectors.

3. A flexible primary battery as recited in claim 1 wherein the first and second flexible current collectors each have a thickness of less than about 50 micrometers.

4. A flexible primary battery as recited in claim 1 wherein the first metal foil is lithographically developed on the first surface of the first polymeric sheet, and the second metal foil is lithographically developed on the second surface of the second polymeric sheet.

5. A flexible primary battery as recited in claim 1 wherein the cathode further comprises an electrical conductivity enhancer.

6. A flexible primary battery as recited in claim 1 wherein the inorganic powder of lithium intercalation compound comprises manganese dioxide.

7. A flexible primary battery as recited in claim 1 wherein the inorganic powder of lithium intercalation compound constitutes at least about 75 weight percent of the cathode.

8. A flexible primary battery as recited in claim 4 wherein the ratio of lithium salts to polymeric binder in the cathode is about 1:4 to about 1:10.

9. A flexible primary battery as recited in claim 4 wherein the cathode comprises up to about 10 weight percent carbon.

10. A flexible primary battery as recited in claim 1 wherein the lithium electrolyte membrane comprises about 4 to about 10 parts polyethylene oxide for each part of lithium salt, the lithium salt being at least one lithium salt selected from the group consisting of lithium triflate, lithium tetrafluoroborate and lithium bis(trifluoromethane sulfone)imide.

11. A flexible primary battery as recited in claim 1 wherein the battery is characterized by a cell voltage of at least about 3 volts, a capacity of at least about 3 milliamp-hours, a stand-by current of at least about 75 nanoamps, and a peak current of at least about 100 microamps for 10 milliseconds.

12. A method for forming a flexible primary battery suitable for microelectronics applications, the method comprising the steps of:

forming first and second flexible current collectors, each of which is formed by photolithographically developing a metal foil on a first surface of a polymeric sheet and etching the metal foil such that the polymeric sheet is exposed at the perimeter of the first surface, and depositing a metal film on a second surface of the polymeric sheet, such that the first and second flexible current collectors are free-standing and each has a thickness of less than 50 micrometers, the polymeric sheet constituting more than half of the thickness so as to promote the flexibility of the first and second flexible current collectors;

forming a flexible foil cathode comprising an inorganic powder of lithium intercalation compound and a lithium salt dispersed in a polymeric binder;

assembling the first and second flexible current collectors, a lithium foil anode, a flexible lithium salt-doped polymer electrolyte membrane, the flexible foil cathode and a polymeric wall, such that the lithium foil anode contacts the metal foil of the first flexible current collector, the flexible foil cathode contacts the metal foil of the second flexible current collector, the polymer electrolyte membrane is between the lithium foil anode and the flexible foil cathode, the polymeric wall circumscribes the metal foils of the first and second flexible current collectors, the lithium foil anode, the polymer electrolyte membrane and the flexible foil cathode, and the polymeric wall abuts the polymeric sheets exposed along the perimeter of the first and second flexible current collectors, so as to form a battery assembly;

heating the battery assembly such that the polymeric sheets of the first and second flexible current collectors, the polymer electrolyte membrane and the polymeric wall partially melt to form a sealed package which encloses the metal foils of the first and second flexible current collectors, the lithium foil anode, the polymer electrolyte membrane, and the flexible foil cathode; and forming leads associated with the first and second flexible current collectors;

wherein the thickness of the battery is not more than about 0.5 millimeter such that the battery is characterized as being flexible, and wherein the battery is characterized by a cell voltage of at least about 3 volts.

13. A flexible primary battery as recited in claim 12 wherein a portion of the first metal foil on the first surface of the first flexible current collector and a portion of the second metal foil on the first surface of the second flexible current collector project outwardly from the polymeric wall to thereby form said current collector leads.

14. A flexible primary battery as recited in as recited in claim 13 wherein said current collector leads are in the shape of a rectangular tab.

15. A method for forming a flexible primary battery suitable for microelectronics applications, the method comprising the steps of:

forming first and second flexible current collectors, each of which is formed by photolithographically developing a metal foil on a first surface of a polymeric sheet and etching the metal foil such that the polymeric sheet is exposed at the perimeter of the first surface, and depositing a metal film on a second surface of the polymeric sheet, such that the first and second flexible current collectors are free-standing and each have a thickness of less than 50 micrometers, the polymeric sheet constituting more than half of the thickness so as to promote the flexibility of the first and second flexible current collectors;

forming a flexible foil cathode comprising an inorganic powder of lithium intercalation compound and a lithium salt dispersed in a polymeric binder;

assembling the first and second flexible current collectors, a lithium foil anode, a flexible lithium salt-doped polymer electrolyte membrane, the flexible foil cathode and a polymeric wall, such that the lithium foil anode contacts the metal foil of the first flexible current collector, the flexible foil cathode contacts the metal foil of the second flexible current collector, the polymer electrolyte membrane is between the lithium foil anode and the flexible foil cathode, the polymeric wall circumscribes the metal foils of the first and second flexible current collectors, the lithium foil anode, the polymer electrolyte membrane and the flexible foil cathode, and the polymeric wall abuts the polymeric sheets exposed along the perimeter of the first and second flexible current collectors, so as to form a battery assembly; and heating the battery assembly such that the polymeric sheets of the first and second flexible current collectors, the polymer electrolyte membrane and the polymeric wall partially melt to form a sealed package which encloses the metal foils of the first and second flexible current collectors, the lithium foil anode, the polymer electrolyte membrane, and the flexible foil cathode;

wherein the thickness of the battery is not more than about 0.5 millimeter such that the battery is characterized as being flexible, and wherein the battery is characterized by a cell voltage of at least about 3 volts.

16. A method as recited in claim 15 wherein the flexible foil cathode further comprises an electrical conductivity enhancer.

17. A method as recited in claim 15 wherein the inorganic powder of lithium intercalation compound comprises manganese dioxide.

18. A method as recited in claim 15 wherein the inorganic powder of lithium intercalation compound constitutes at least about 75 weight percent of the flexible foil cathode.

19. A method for forming a flexible primary battery suitable for microelectronics applications, the method comprising the steps of:

forming first and second flexible current collectors, each of which is formed by photolithographically developing a copper foil on a first surface of a polymeric sheet and etching the copper foil such that the polymeric sheet is exposed at the perimeter of the first surface, and depositing a metal film on a second surface of the polymeric sheet, such that the first and second flexible current collectors are free-standing and each has a thickness of no more than about 40 micrometers, the polymeric sheet constituting more than half of the thickness so as to promote the flexibility of the first and second flexible current collectors;

placing a lithium foil anode, on the copper foil of the first flexible current collector;

placing a flexible lithium salt-doped polymer electrolyte membrane on the lithium foil anode, the polymer electrolyte membrane comprising about 4 to about 10 parts polyethylene oxide for each part of lithium salt;

placing a flexible foil cathode on the polymer electrolyte membrane, the flexible foil cathode comprising an inorganic powder of lithium intercalation compound and a lithium salt dispersed in a polymeric binder, the inorganic powder of lithium intercalation compound constituting at least about 75 weight percent of the flexible foil cathode and the ratio of lithium salts to polymeric binder in the flexible foil cathode is about 1:4 to about 1:10;

circumscribing the copper foil of the first flexible current collector, the lithium foil anode, polymer electrolyte membrane and flexible foil cathode with a polymeric wall which abuts the polymeric sheet exposed along the perimeter of the first flexible current collector;

placing the second flexible current collector on the flexible foil cathode such that the copper foil of the second flexible current collector overlays the flexible foil cathode and such that the polymeric sheet exposed along the perimeter of the second flexible current collector abuts the polymeric wall, so as to form a battery assembly;

heating the battery assembly such that the polymeric sheets of the first and second flexible current collectors, the polymer electrolyte membrane and the polymeric wall partially melt to form a flexible sealed package which encloses the copper foils of the first and second flexible current collectors, the lithium foil anode, the polymer electrolyte membrane, and the flexible foil cathode; and forming leads associated with the first and second flexible current collectors;

wherein the thickness of the battery is not more than about 0.5 millimeter such that the battery is characterized as being flexible, and wherein the battery is characterized by a cell voltage of at least about 3 volts, a capacity of at least about 3 milliamp-hours, a stand-by current of at least about 75 nanoamps, and a peak current of at least about 100 microamps for 10 milliseconds.

20. A method as recited in claim 15 further comprising the step of forming the flexible foil cathode as a slurry, applying the slurry directly to the metal foil of the second flexible current collector, and drying the slurry so as to form the flexible foil cathode and adhere the flexible foil cathode to the metal foil of the second flexible current collector.

21. A method as recited in claim 15 wherein the polymer electrolyte membrane comprises about 4 to about 10 parts polyethylene oxide for each part of lithium salt, the lithium salt being at least one lithium salt selected from the group consisting of lithium triflate, lithium tetrafluoroborate and lithium bis(trifluoromethane sulfone)imide.

22. A method as recited in claim 14 further including the step of forming first and second current collector leads.

23. A method as recited in claim 22 wherein said first and second current collector leads are formed during the step of forming said first and second flexible current collectors.

24. A method as recited in claim 23 wherein said first and second current collector leads are formed during said etching step and constitute a part of said metal foil.

25. A method for forming a flexible primary battery suitable for microelectronics applications, the method comprising the steps of:

forming first and second flexible current collectors, each of which is formed by photolithographically developing a copper foil on a first surface of a polymeric sheet and etching the copper foil such that the polymeric sheet is exposed at the perimeter of the first surface, and depositing a metal film on a second surface of the polymeric sheet, such that the first and second flexible current collectors are free-standing and each have a thickness of no more than about 40 micrometers, the polymeric sheet constituting more than half of the thickness so as to promote the flexibility of the first and second flexible current collectors;

placing a lithium foil anode on the copper foil of the first flexible current collector;

placing a flexible lithium salt-doped polymer electrolyte membrane on the lithium foil anode, the polymer electrolyte membrane comprising about 4 to about 10 parts polyethylene oxide for each part of lithium salt;

placing a flexible foil cathode on the polymer electrolyte membrane, the flexible foil cathode comprising an inorganic powder of lithium intercalation compound and a lithium salt dispersed in a polymeric binder, the inorganic powder of lithium intercalation compound constituting at least about 75 weight percent of the flexible foil cathode and the ratio of lithium salts to polymeric binder in the flexible foil cathode is about 1:4 to about 1:10;

circumscribing the copper foil of the first flexible current collector, the lithium foil anode, polymer electrolyte membrane and flexible foil cathode with a polymeric wall which abuts the polymeric sheet exposed along the perimeter of the first flexible current collector;

placing the second flexible current collector on the flexible foil cathode such that the copper foil of the second flexible current collector overlays the flexible foil cathode and such that the polymeric sheet exposed along the perimeter of the second flexible current collector abuts the polymeric wall, so as to form a battery assembly; and heating the battery assembly such that the polymeric sheets of the first and second flexible current collectors, the polymer electrolyte membrane and the polymeric wall partially melt to form a flexible sealed package which encloses the copper foils of the first and second flexible current collectors, the lithium foil anode, the polymer electrolyte membrane, and the flexible foil cathode;

wherein the thickness of the battery is not more than about 0.5 millimeter such that the battery is characterized as being flexible, and wherein the battery is characterized by a cell voltage of at least about 3 volts, a capacity of at least about 3 milliamp-hours, a stand-by current of at least about 75 nanoamps, and a peak current of at least about 100 microamps for 10 milliseconds.

26. A method as recited in claim 19 wherein the flexible foil cathode is formed by a slurry which is applied directly to the metal foil of the second flexible current collector, and then dried so as to form the flexible foil cathode and adhere the flexible foil cathode to the metal foil of the second flexible current collector.

27. A method as recited in claim 26 further including the step of forming first and second current collector leads.

28. A method as recited in claim 27 wherein said first and second current collector leads are formed during the step of forming said first and second flexible current collectors.

29. A method as recited in claim 28 wherein said first and second current collector leads are formed during said etching step and constitute a part of said metal foil.

\* \* \* \* \*